May 5, 1964     W. RODENACKER     3,131,430
EXTRUSION WORM FOR THE MELTING OF ORGANIC THERMOPLASTICS
Filed Oct. 12, 1961
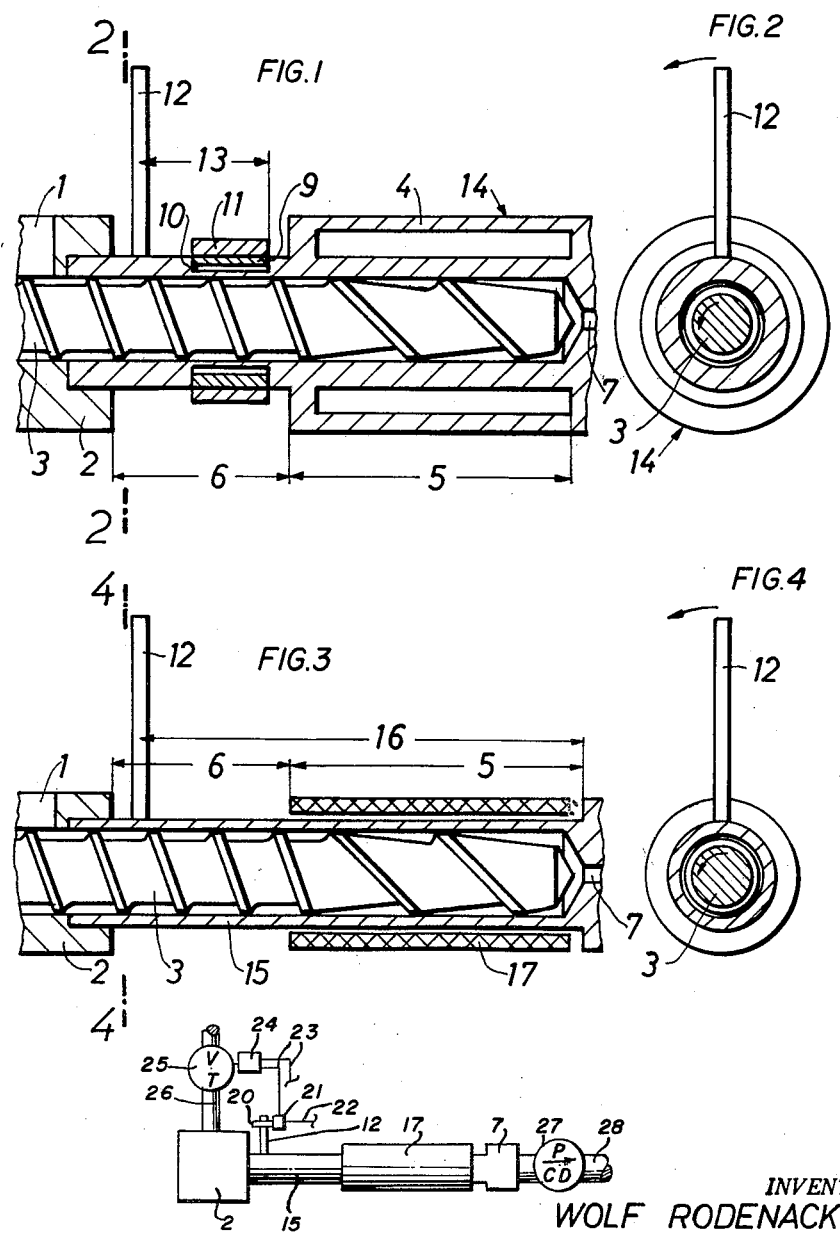
INVENTOR.
WOLF RODENACKER
BY
Burgess, Dinklage & Sprung
ATTORNEYS

United States Patent Office 3,131,430
Patented May 5, 1964

3,131,430
EXTRUSION WORM FOR THE MELTING OF
ORGANIC THERMOPLASTICS
Wolf Rodenacker, Dormagen, Germany, assignor to
Farbenfabriken Bayer Aktiengesellschaft, Leverkusen, Germany, a corporation of Germany
Filed Oct. 12, 1961, Ser. No. 144,607
8 Claims. (Cl. 18—12)

The invention relates to an extrusion worm for the melting of organic thermoplastics, in particular polyamides or polyurethanes, wherein the worm housing has, upstream of a heated melting zone a preheating zone wherein the heating is less intense than that of the melting zone, and has, furthermore, downstream of the melting zone, a member for the constrained removal of the melt. It is the object of this arrangement to establish the greatest possible degree of correspondence between the feed quantity of the solid material to the extruder and the withdrawal quantity of the melt which is to be kept constant, this being a requirement which must be fulfilled in particular for the preparation of uniform filiform structures.

It has already been proposed to use the pressure produced by the worm for flow control, since the pressure depends on the worm length acted upon by liquid. A pressure gauge or displacement of the worm in response to pressure variation can be utilized. These methods have, however, the following disadvantages. Since the sequentially-connected, constrainedly-operating conveyor members, such as for example gear pumps, have for their part a certain degree of permeability whereas the worms are able to build up considerable pressures, it is unavoidable that, with increasing pressure, either the following conveyor members lose their fluid-tightness under high pressure or the filling of the gear pump varies so that the output is changed. The conventional adjustment possibilities are not suitable for the exact maintenance of the output, such as is for example necessary for the production of filiform structures.

It has now been found that these disadvantages are obviated if the worm housing is, according to the invention, constructed at least in the region of the zone which is heated with a lesser degree of intensity than that of the melting zone, as a unilaterally secured torsion member to the exterior of which there is secured a lever which in per se known manner actuates the switching on and off contact for the drive of a proportioning or material feed device.

In the zone heated with lesser intensity than the melting zone, the viscosity of the conveyed material is higher than in the melting zone proper. If the quantity of synthetic plastic material which is fed increases so that it exceeds the quantity of the melt which is withdrawn (for example, approximately the output of a spinning pump), a shift of the solid liquid phase boundary in the direction of the feed aperture of the solid material into the zone of lower temperature takes place, so that in this zone of lower temperature, rotation of the worm housing, which is constructed as a torsion member, takes place, with a corresponding deflection of the switching lever secured on the housing. A part or the entire housing can be constructed as a torsion member.

At the torsional mounting of the worm housing in the region of the zone of lower temperature, the housing is preferably formed with a recess in which is inserted a needle bearing for taking up the inner pressure. It is, however, also possible to construct the entire worm housing as a torsion member, for the purpose of increasing the clamping length and the sensitivity of control.

Constructional examples of the subject of the invention are diagrammatically illustrated in the drawings, wherein FIGURE 1 shows a longitudinal section through a worm extruder the housing of which is constructed as a torsion member only in the zone upstream of the melting zone; FIGURE 2 shows a cross-section through the said extruder in the direction 2—2; FIGURE 3 is a longitudinal section through an extruder wherein the entire worm housing is constructed as a torsion member, for the purpose of enlarging the clamping length; FIGURE 4 shows the cross-section through this device in the direction 4—4, and FIG. 5 is a schematic view corresponding with FIG. 3 but showing in addition feed and withdrawal means for use in combination with the apparatus.

The material to be melted, for example in the form of chips, is fed through conduit 26 without pressure through the introduction aperture 1 in the housing 2, on to the worm 3 rotating in the housing and conveyed to the right to the melting zone 5 provided with a heating jacket 4. Between the introduction aperture 1 and the melting zone 5, the material has to pass through a zone 6 which is maintained at a temperature set at a value which is lower by a predetermined, selectable amount than the temperature in the melting zone 5. The heating of the zone 6 is not shown. A specific and constant quantity of molten material is withdrawn from the melting zone 5, at 7, for example by means of a spinning pump such as constant displacement pump 27 which receives molten material from the outlet 7 and pumps it into delivery conduit 28.

If the quantity of melted plastic substance in the melting zone 5 exceeds the quantity removed, for example the output of the spinning pump, the phase boundary between solid and liquid is displaced into the zone 6, so that a part of the torque of the worm causes a rotation of the worm housing constructed as a torsion member and firmly secured on the pump side, this being also accompanied by a deflection of the switching lever. According to FIGURE 1, the housing is weakened by a recess 9. In order to take up the inner pressure, the recess is filled with needles 10 of a needle bearing which transmit the inner pressure to a clamping ring 11. By means of the switching lever 12, which is secured on the housing and which rotates by a specific amount relatively to the housing part 14, depending on the clamping length 13, a switching-on and switching-off contact 20 of an electrical switch 21 serves to control a proportioning or feed control device 25 which can be a throttling valve outfitted with a motor drive 24. Power lines 23 are provided for supplying power to the motor 24, and one of these power lines is also connected with line 22, through switch 21. Thus, the rate of feed of material to be worked is controlled by the operation of the lever 12.

In order to enlarge the clamping length and therewith to provide a sensitivity adjustment, it is possible, as shown in FIGURE 3, also to construct the housing 15 over its entire length as a torsion member, i.e., as a hollow torsion bar. Thus in FIG. 3 the clamping length can be the length 16. Reference numeral 17 designates an electrical heating device for the melting zone 5. The heating device for the zone 6 to which a specific temperature is to be given is not shown.

Relatively to the hitherto-known feed-regulating arrangements, the device according to the invention provides a substantial decrease in the variation coefficients (dispersion) of the output. Whereas, hitherto, it was necessary to reckon with a coefficient of 1.5%, the dispersion is now diminished to 0.8%, in the melting of polyamide of specified origin.

I claim:

1. Extrusion apparatus for the melting of solid finely divided thermoplastic material comprising an extruder housing, a material inlet to said housing, a material discharge from said housing, a worm for advancing of material through the housing and the extrusion thereof from the discharge, heater means for supplying heat to the extruder adjacent the discharge thereof for the melting of the thermoplastic material in the melting zone adjacent the discharge, whereby material adjacent the discharge is melted and material adjacent the inlet is a finely divided solid, said housing being mounted for rotational movement of at least a part thereof in response to torque imposed thereon by the working of the material by the worm, means responsive to said rotational movement and means for controlling the rate of material feed to the device, said means responsive to the rotational movement being effective to govern said control means, whereby upon variation in torque in accordance with residence time of material in the housing, the feed rate to the extruder can be varied in accordance with the residence time.

2. Extrusion apparatus according to claim 1, wherein adjacent said melting zone on the material inlet side thereof, the housing includes a section of reduced cross-section to form a recess therein, whereby a housing portion on the material inlet side of said recess is provided for said rotation.

3. Extrusion apparatus according to claim 2, and including a needle bearing mounted in said recess.

4. Extrusion apparatus according to claim 1, wherein the rotatable part of the housing extends to the discharge thereof.

5. In combination, extrusion apparatus according to claim 1 and means for withdrawing melted plastic from the extrusion apparatus in constant quantity.

6. In combination, extrusion apparatus according to claim 2 and means for withdrawing melted plastic from the extrusion apparatus in constant quantity.

7. In combination, extrusion apparatus according to claim 3 and means for withdrawing melted plastic from the extrusion apparatus in constant quantity.

8. In combination, extrusion apparatus according to claim 4 and means for withdrawing melted plastic from the extrusion apparatus in constant quantity.

References Cited in the file of this patent

UNITED STATES PATENTS

| | | |
|---|---|---|
| 2,369,553 | Fields | Feb. 13, 1945 |
| 2,493,591 | Newton | Jan. 3, 1950 |
| 2,747,224 | Koch et al. | May 29, 1956 |